(12) United States Patent
Baker

(10) Patent No.: US 9,148,987 B2
(45) Date of Patent: Oct. 6, 2015

(54) AGRICULTURAL CADDY AND TRAILER ASSEMBLY

(71) Applicant: PENTA TMR INC., Petrolia (CA)

(72) Inventor: John Baker, Wyoming (CA)

(73) Assignee: PENTA TMR INC., Petrolia, Ontario (CA)

( * ) Notice: Subject to any disclaimer, the term of this patent is extended or adjusted under 35 U.S.C. 154(b) by 86 days.

(21) Appl. No.: 13/826,488

(22) Filed: Mar. 14, 2013

(65) Prior Publication Data

US 2013/0269959 A1    Oct. 17, 2013

Related U.S. Application Data

(60) Provisional application No. 61/623,292, filed on Apr. 12, 2012.

(51) Int. Cl.
*A01B 51/04*    (2006.01)
*A01B 73/04*    (2006.01)

(52) U.S. Cl.
CPC .............. *A01B 51/04* (2013.01); *A01B 73/044* (2013.01)

(58) Field of Classification Search
USPC .................. 280/38, 39; 172/311, 669; 56/214
IPC ........................................... A01B 51/04,73/044
See application file for complete search history.

(56) References Cited

U.S. PATENT DOCUMENTS

| | | | | |
|---|---|---|---|---|
| 2,641,886 A | * | 6/1953 | Graham | 172/311 |
| 3,981,472 A | | 9/1976 | Anderson | |
| 4,286,672 A | * | 9/1981 | Forsyth et al. | 172/311 |
| 4,324,296 A | * | 4/1982 | Schenk et al. | 172/311 |
| 4,350,211 A | * | 9/1982 | Coufal | 172/311 |
| 4,867,245 A | * | 9/1989 | Stevens | 172/311 |
| 5,303,779 A | * | 4/1994 | Friggstad | 172/311 |
| 6,089,329 A | * | 7/2000 | Smith | 172/452 |
| 6,220,366 B1 | * | 4/2001 | Noonan et al. | 172/311 |
| 6,401,832 B1 | * | 6/2002 | Payne et al. | 172/238 |
| 6,408,950 B1 | * | 6/2002 | Shoup | 172/311 |
| 6,684,962 B1 | * | 2/2004 | Lewallen | 172/311 |
| 6,902,010 B2 | * | 6/2005 | Shoup | 172/456 |
| 7,438,137 B2 | * | 10/2008 | Pederson et al. | 172/311 |

* cited by examiner

*Primary Examiner* — Gary Hartmann
(74) *Attorney, Agent, or Firm* — Gowling Lafleur Henderson LLP; Neil Henderson

(57) ABSTRACT

An agricultural caddy assembly and agricultural trailer are provided. The agricultural caddy assembly includes a wheel attachment member, a tractor-tool attachment frame, and a bolster for rotatably connecting the wheel attachment member to the tractor-tool attachment frame. The agricultural trailer includes a tractor hitch, a tool frame, a wheel attachment member, a tractor-tool attachment frame connected to the tractor hitch and the tool frame, and a bolster for rotatably connecting the wheel attachment member to the tractor-tool attachment frame.

11 Claims, 6 Drawing Sheets

US 9,148,987 B2

AGRICULTURAL CADDY AND TRAILER ASSEMBLY

CROSS REFERENCE TO RELATED APPLICATIONS

This application claims the benefit of priority of U.S. Provisional Patent Application No. 61/623,292 filed Apr. 12, 2012, which is incorporated herein by reference in its entirety.

FIELD

The present disclosure relates generally to agricultural equipment. More particularly, the present disclosure relates to an agricultural trailer having a caddy assembly.

BACKGROUND

Large farming and agricultural equipment is desirable when working large fields. Agricultural equipment typically includes a tool frame mounted on a wheel assembly and a trailer hitch for attachment to a tractor or the like. Conventional mounting assemblies used in agricultural equipment provide for rigidly attaching the tool frames to wheel assemblies for mobility. This arrangement may increase the stress placed on the tool frame causing undue wear and maintenance. In particular, having the wheel assembly fixed to the tool frame may cause forces to spread to the outer part of the tool frame causing stress on the welds. There may be significant bending and stress placed on the tool frame as the equipment passes over uneven terrain common to farming conditions. This stress and bending of the equipment may cause premature wear and reduction in strength of the tool frame. In some conventional systems, the frame may not have front wheels and instead be supported by the tractor at the hitch. This places the load of the front of the agricultural equipment entirely on the tractor hitch. This places an extra load on the tractor hitch such that the work capacity of the tractor may be at least partially taken up by the weight of the agricultural equipment.

It is, therefore, desirable to provide an improved agricultural trailer and caddy assembly that overcomes at least some of the problems with conventional assemblies.

SUMMARY

It is an object of the present disclosure to obviate or mitigate at least one disadvantage of previous systems.

In an aspect, the present disclosure provides an agricultural caddy assembly. The agricultural caddy assembly includes a wheel attachment member, a tractor-tool attachment frame, and a bolster for rotatably connecting the wheel attachment member to the tractor-tool attachment frame.

In an aspect, the present disclosure provides an agricultural trailer. The agricultural trailer includes a tractor hitch, a tool frame, a wheel attachment member, a tractor-tool attachment frame connected to the tractor hitch and the tool frame, and a bolster for rotatably connecting the wheel attachment member to the tractor-tool attachment frame.

In an aspect, the wheel attachment member rotates about a pivot axis relative to the tractor-tool attachment frame, and wherein the pivot axis is parallel to a forward direction of travel of the agricultural caddy assembly.

In an aspect, the agricultural caddy further includes a set of wheels connected to the wheel attachment member. In an aspect, the agricultural trailer further includes a set of wheels connected to the wheel attachment member.

In an aspect, the tractor-tool attachment frame connects to a tractor hitch and a tool frame. In an aspect, the tool frame comprises at least one tool for working the land. In an aspect, the tractor-tool attachment frame pivotably connects to the tractor hitch. In an aspect, the tractor-tool attachment frame pivotably connects to the tool frame.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides embodiments of a piece of agricultural equipment such as an agricultural trailer assembly having a caddy assembly.

Figure 1:
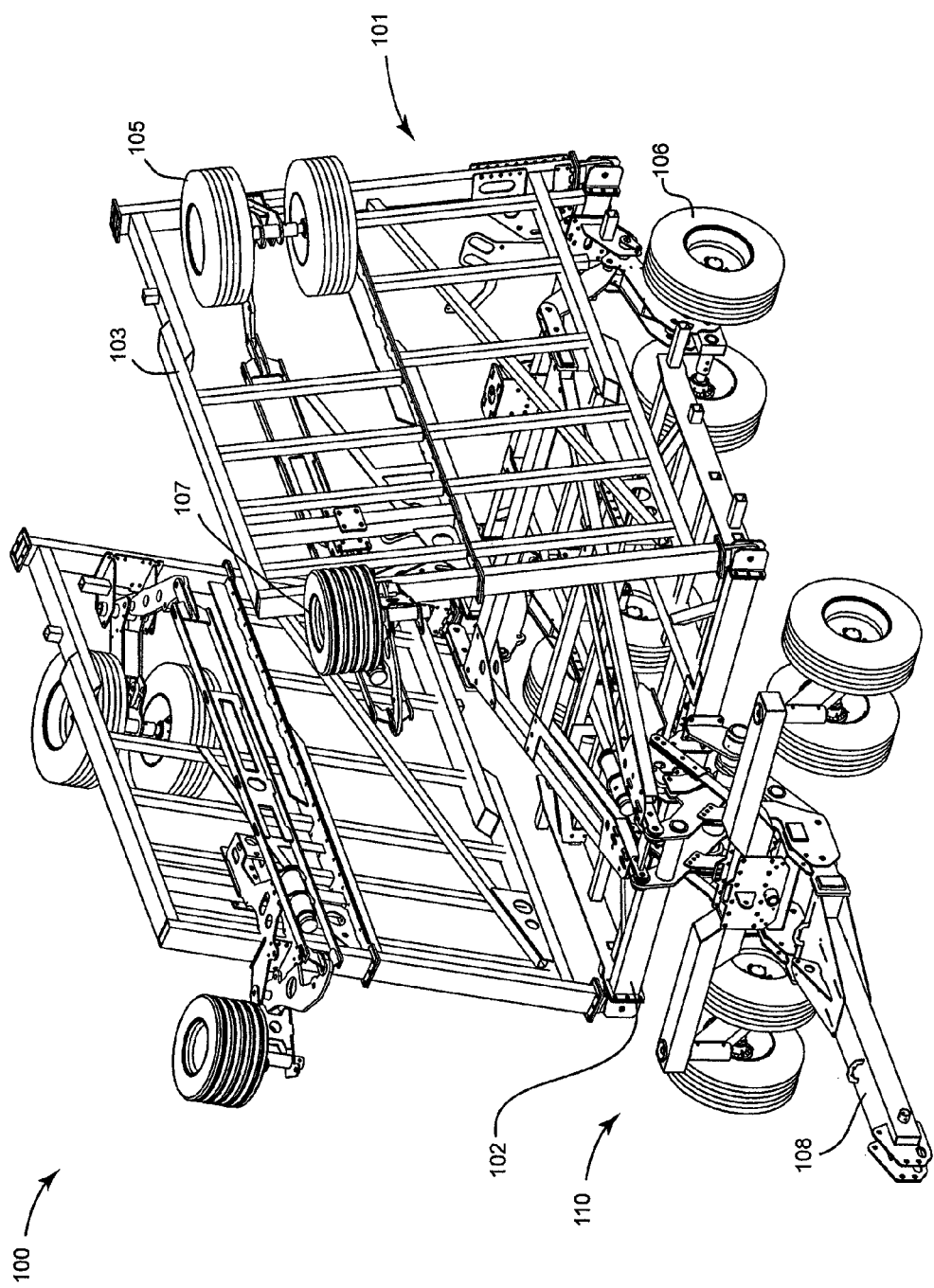
FIG. 1 is a perspective view of a trailer assembly, in accordance with at least one embodiment.
Figure 2A:
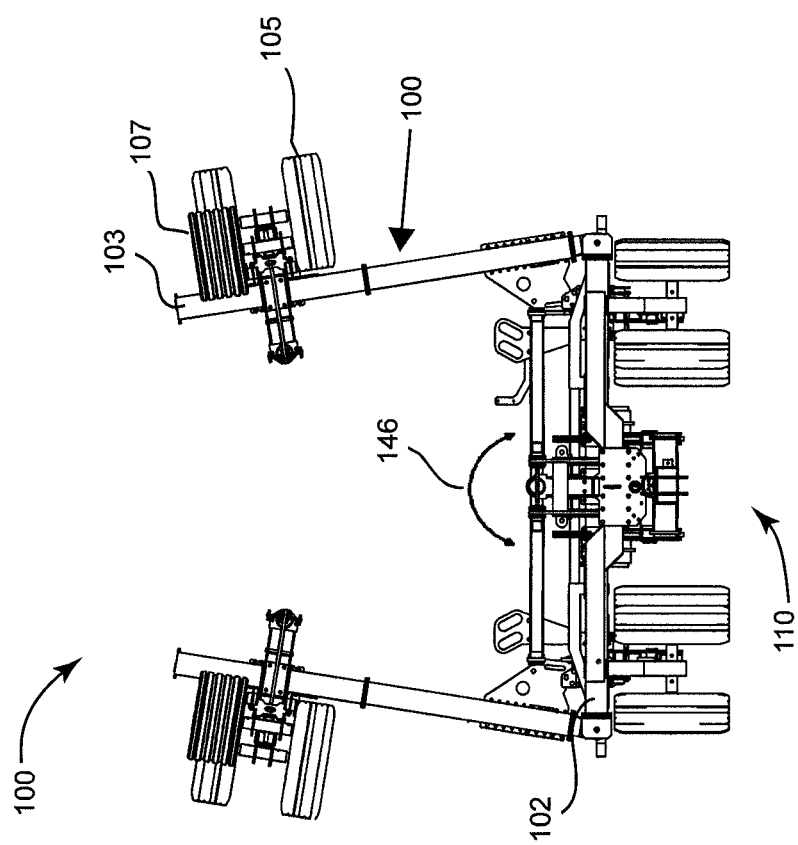
FIGS. 2A-2C are front, top, and side view of the trailer assembly of FIG. 1.
Figure 2B:
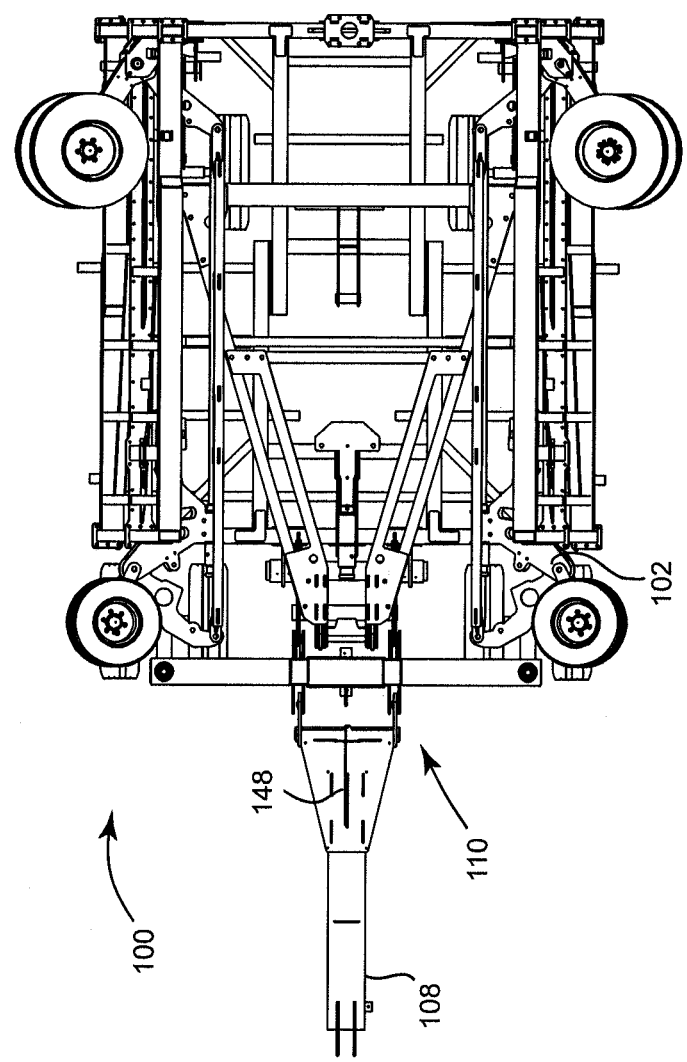
Figure 2C:
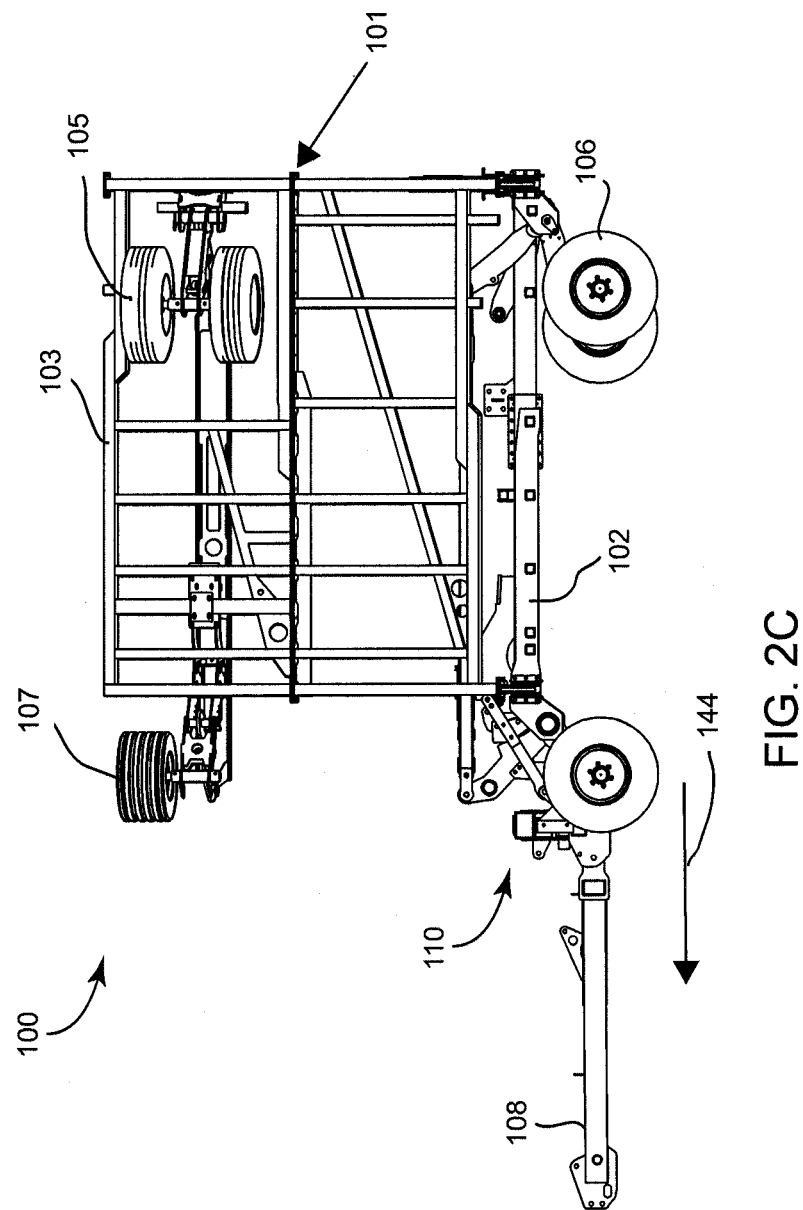

FIGS. 1, 2A, 2B, and 2C illustrate a trailer assembly 100 according to an embodiment herein. The trailer assembly 100 comprises a tool frame 102, a tractor hitch 108, and a caddy assembly 110. The tractor hitch 108 attaches to a piece of farming equipment, such as a tractor (not shown), for moving the trailer assembly 100. When in operation, the tractor pulls the trailer assembly 100 in a direction of travel, for example, as along direction 144 (as shown in FIG. 2C).

The tool frame 102 is equipped with a number of tools (not shown) for engaging with and working the land. The tools may be, for example, shanks, C shanks, S tines, tillers, shovels, chisel ploughs, hoes, mattocks, openers, knives, sweep cultivators or the like. The tools may be adjustably positioned on the tool frame 102 and at variable heights in relation to the tool frame 102 and generally in relation to the ground being worked. The tool frame 102 has a rear movement assembly (e.g. wheels) 106 that interact with the land being worked and may include a suspension or the like.

In a variant, the agricultural equipment 100 may have at least one side attachment 101 attached to a center section of the frame 102. The at least one side attachment 101 includes a side attachment frame 103 and a side attachment movement assembly (e.g. wheels) 105. Similar to frame 102, the side attachment frame 103 is also equipped with a number of tools (not shown). The side attachment 101 may have a front side attachment movement assembly (e.g. wheels) 107. The side attachment 101 may be foldable such that it is folded up for transport and folded down when the tools are in use. When folded down, the side attachment 101 increases a working area of the tools.

Figure 3:
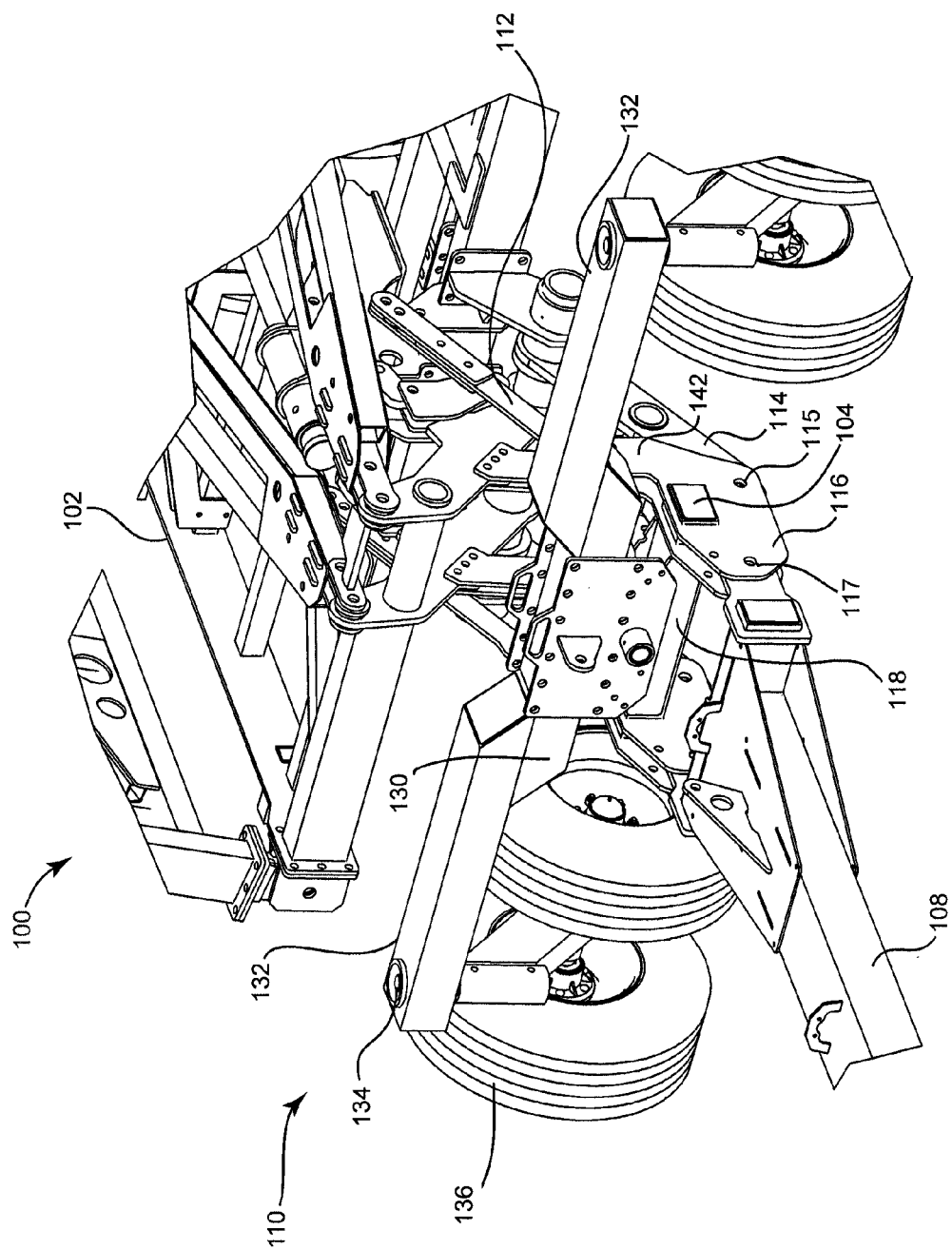
FIG. 3 is a detailed perspective view of an agricultural caddy assembly, in accordance with an embodiment herein.

FIG. 3 illustrates a view of the front of the trailer assembly 100 and, in particular, an embodiment of the caddy assembly 110. The caddy assembly 110 includes a tractor-tool attachment frame 104. The tractor-tool attachment frame 104 supports weight of the front end of the tool frame 102 and attaches the tool frame 102 to the tractor hitch 108. The tractor hitch 108 is intended to reduce or prevent lateral movement of the caddy assembly 110.

The tractor-tool attachment frame 104 includes a guide bracket 116 and a tractor-tool attachment cross member 118. The guide bracket 116 is rotatably attached at front end 117 to the tractor hitch 108. The caddy assembly 110 may have an aperture bracket 138 for connecting a front end control (not shown) to the tractor hitch 108. The front end control controls the rotational position of the tractor-tool attachment frame 104 with respect to the tractor hitch 108.

Alternatively, the tractor hitch 108 may be affixed (e.g. welded or securely bolted) to the guide bracket 116, limiting rotation.

The guide bracket 116 is rotatably attached at a back end 115 to the tool frame 102 by tool frame attachment members 114. The tool frame attachment members 114 are intended to reduce or prevent lateral movement of the tool frame 102 relative to the caddy assembly 110. The position of tool frame 102 relative to the caddy assembly 110 is controlled by tool frame controls 112. The tool frame controls 112 may be, for example, hydraulic cylinders able to position the tool frame 102 at an appropriate position in relation to the caddy assembly 110 and the land. The tractor-tool attachment frame 104 may also include a set of connectors to connect to the tool frame controls 112. The tool frame attachment members 114 and the tool frame controls 112 may allow for horizontal movement of the tool frame 102 relative to the caddy assembly 110.

Alternatively, the tool frame attachment members 114 may be affixed (e.g. welded or securely bolted) to the guide bracket 116, limiting rotation.

Figure 4:
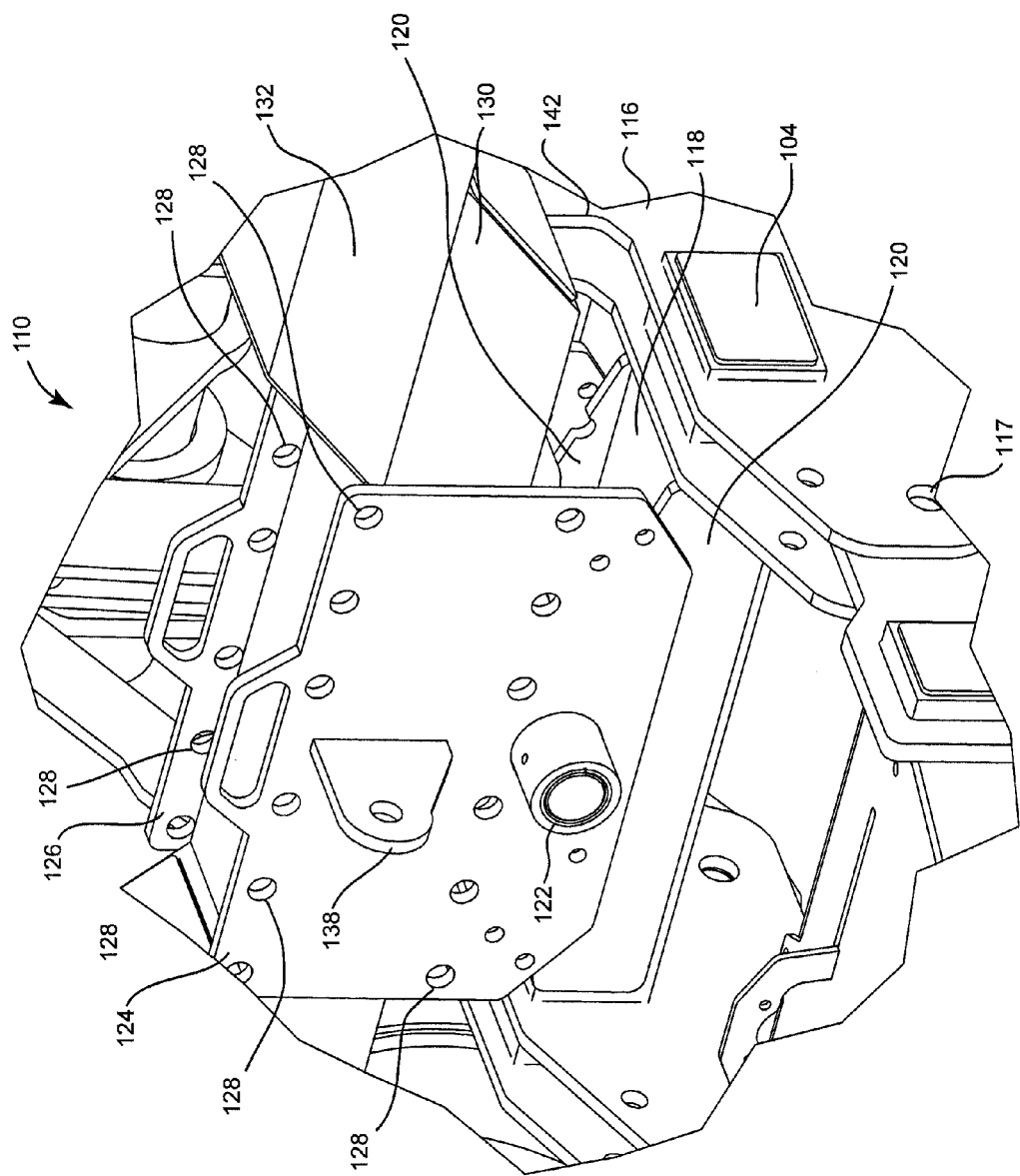
FIG. 4 is a further detailed perspective view of the agricultural caddy assembly of FIG. 3.

FIG. 4 illustrates a further view of the caddy assembly 110 and in particular a bolster 122. The tractor-tool attachment frame 104 is rotatably connected to a wheel attachment member 130 via the bolster 122. The bolster 122 is intended to relieve stress placed on the tool frame 102 while working the land. The bolster 122 may comprise a brass bushing that allows for reduced friction during pivoting and rotation. The bolster 122 allows the wheel attachment member 130 to roll along direction 146 (as shown in FIG. 2A) about a pivot axis 148 (as shown in FIG. 2B) concentric with the bolster 122. The pivot axis is collinear with a forward direction of travel (such as direction 144 as shown in FIG. 2C) of the caddy assembly 110, for example, when the caddy assembly 110 is being pulled forward by a tractor. The pivoting of the caddy assembly 110 allows for a movement system (e.g. wheels) 136 to move up and down with respect to the frame 102 while the caddy assembly 110 passes over uneven terrain.

As shown in FIG. 4, the bolster 122 is rotatably attached to a set of front and rear bolster frame plates 120. The front and rear bolster frame plates 120 are provided to a tractor-tool attachment cross member 118 which crosses laterally between the two guide brackets 116. The guide brackets 116 then attach to the tractor hitch assembly 108 and the tool frame 102 as described above.

The bolster 122 passes through a front top bolster plate 124 and a rear top bolster plate 126. The front top bolster plate 124 and a rear top bolster plate 126 may be secured to the wheel attachment member 130 using a number of bolts and nuts (not shown) passing through apertures 128 in the front and rear top bolster plates 124, 126. In an alternative, in replacement of, or in addition to the bolts and nuts, the front top bolster plate 124 and the rear top bolster plate 126 may be welded to the wheel attachment member 130.

The wheel attachment member 130 extends laterally and attaches on both ends to wheel extension members 132. The wheel extension members 132 allow for clearance between a top surface of a recess in the guide bracket 116 when the wheel attachment member 130 pivots relative to the guide bracket 116.

Turning back to FIG. 3, the wheel extension members 132 and the wheel attachment member 130 are guided by rear guide plates 142 of the guide bracket 116. The rear plates 142 of the guide bracket 116 prevent the wheel attachment member 130 from yawing relative to the tractor-tool attachment frame 104. In some cases, front guide plates (not shown) are provided, in addition to or in replacement of the rear guide plates 142. The front and rear guide plates 142 allow for the bolster 122 to pivot only about the pivot axis along the forward direction of travel of the caddy assembly 110.

Each wheel extension member 132 attaches to a movement assembly (for example, a castor 134 attached to a set of wheels 136). The castor 134 allows for vertical rotation of the wheels 136.

The present disclosure provides a trailer and caddy assembly intended to mitigate stresses placed on the tool frame. The bolster 122 allows the front of the tool frame 102 to be supported by a set of wheels 136 which takes the load off of the tractor hitch 108.

Further, the rocking bolster 122 allows rotation is intended to reduce wear placed on the frame 102 by reducing stress created while operating the trailer assembly 100 over uneven terrain.

Advantageously, the caddy assembly 110 may be usable with multiple different tool frames 102, thus reducing duplication of resources.

Further, in certain embodiments, where the tractor-tool attachment frame 104 is pivotably attached to the tool frame 102, the load of the tool frame is placed on the wheels 136 of the caddy assembly 110 while the frame 102 is able to rotate relative to the wheels 136 to further reduce stress and strain placed on the frame 102 and the caddy assembly 110.

In certain embodiments, where the tractor-tool attachment frame 104 is pivotably attached to the tractor hitch 108 (for example, at 117), the tractor hitch 108 is able to rotate relative to the wheels 136 to further reduce stress and strain placed on the tool frame 102 and the caddy assembly 110.

In the preceding description, for purposes of explanation, numerous details are set forth in order to provide a thorough understanding of the embodiments. However, it will be apparent to one skilled in the art that these specific details may not be required. In other instances, well-known structures and may be shown in block diagram form in order not to obscure the understanding.

The above-described embodiments are intended to be examples only. Alterations, modifications and variations can be effected to the particular embodiments by those of skill in the art without departing from the scope, which is defined solely by the claims appended hereto.

What is claimed is:
1. An agricultural caddy assembly, comprising:
a wheel attachment member;
a tractor-tool attachment frame configured to connect with a tool frame; and
a bolster supported between the wheel attachment member and the tractor-tool attachment frame such that the wheel attachment member rotates about a pivot axis of the bolster relative to the tractor-tool attachment frame, wherein the pivot axis is parallel to a forward direction of travel of the agricultural caddy assembly, and wherein the bolster is supported between the wheel attachment member and the tractor-tool attachment frame by:

at least one bolster plate provided to the tractor-tool attachment frame; and at least one top bolster plate provided to the wheel attachment frame, wherein the bolster passes through the at least one bolster plate and the at least one top bolster plate.

2. The agricultural caddy assembly of claim 1, further comprising a set of wheels connected to the wheel attachment member.

3. The agricultural caddy assembly of claim 1, further comprising a tractor hitch, wherein the tractor-tool attachment frame connects to the tractor hitch.

4. The agricultural caddy assembly of claim 3, wherein the tool frame comprises at least one tool for working the land.

5. The agricultural caddy assembly of claim 3, wherein the tractor-tool attachment frame pivotably connects to the tractor hitch.

6. The agricultural caddy assembly of claim 3, wherein the tractor-tool attachment frame is configured to pivotably connect to the tool frame.

7. An agricultural trailer comprising:
a tractor hitch;
a tool frame;
a wheel attachment member;
a tractor-tool attachment frame connected to the tractor hitch and the tool frame; and
a bolster supported between the wheel attachment member and the tractor-tool attachment frame such that the wheel attachment member rotates about a pivot axis of the bolster relative to the tractor-tool attachment frame, wherein the pivot axis is parallel to a forward direction of travel of the agricultural caddy assembly, and wherein the bolster is supported between the wheel attachment member and the tractor-tool attachment frame by:

at least one bolster plate provided to the tractor-tool attachment frame; and at least one top bolster plate provided to the wheel attachment frame, wherein the bolster passes through the at least one bolster plate and the at least one top bolster plate.

8. The agricultural trailer of claim 7, further comprising a set of wheels connected to the wheel attachment member.

9. The agricultural trailer of claim 7, wherein the tool frame comprises at least one tool for working the land.

10. The agricultural trailer of claim 7, wherein the tractor-tool attachment frame pivotably connects to the tractor hitch.

11. The agricultural trailer of claim 7, wherein the tractor-tool attachment frame pivotably connects to the tool frame.

* * * * *